United States Patent [19]

Huszty et al.

[11] 3,943,411

[45] Mar. 9, 1976

[54] OVERLOAD PROTECTION AND DISPLAY CIRCUIT, PARTICULARLY FOR SOUND RADIATORS

[76] Inventors: Dénes Huszty, 33, Vercse utca, Budapest XII; Emil Seszták, 12, Marx Karoly ut, Maglod, both of Hungary

[22] Filed: Apr. 10, 1974

[21] Appl. No.: 459,684

Related U.S. Application Data

[63] Continuation-in-part of Ser. No. 287,077, Sept. 7, 1972.

[30] Foreign Application Priority Data

Apr. 7, 1972 Hungary............................ EE 2018

[52] U.S. Cl.................. 317/33 R; 317/41; 317/37; 317/52
[51] Int. Cl.² ............................................ H02H 3/08
[58] Field of Search ......... 317/31, 33 R, 37, 41, 49, 317/52, 132, 131, 133.5; 340/228 R, 248 C, 253 A; 219/505, 506

[56] References Cited
UNITED STATES PATENTS

| | | | |
|---|---|---|---|
| 2,377,506 | 6/1945 | McWhirter et al. ............... | 317/41 X |
| 2,438,495 | 3/1948 | Chatterjea ............................ | 317/41 |
| 3,079,982 | 3/1963 | Staring............................ | 340/228 R |
| 3,185,974 | 5/1965 | Doane.......................... | 340/228 R X |
| 3,320,493 | 5/1967 | Culbertson...................... | 317/31 X |
| 3,486,080 | 12/1969 | Tillmann............................ | 317/132 |
| 3,702,418 | 11/1972 | Obenhaus ........................ | 317/41 X |

Primary Examiner—J. D. Miller
Assistant Examiner—Patrick R. Salce
Attorney, Agent, or Firm—Haseltine, Lake & Waters

[57] ABSTRACT

Subject-matter of the invention is an overload protection and display circuit, in particular for operation in conjunction with high-power sound radiators, and including one or more protective circuits therein. Each circuit senses the real value of the electrical sign applied to their inputs. The moment of interference depends on the averaged real output of an adequately long memory period preceding the interference. Consequently the sound radiators may be operated controlled by an output considerably in excess of the usual.

Improved results are achieved by connecting an indirectly heated thermistor in series with the winding of an interfering relay, and using a Zener diode connected for operation in the reverse direction, while the filament windings of the indirectly heated thermistor are terminated on the input points of the protective circuit through a resistance.

10 Claims, 16 Drawing Figures

OVERLOAD PROTECTION AND DISPLAY CIRCUIT, PARTICULARLY FOR SOUND RADIATORS

This application is a Continuation-in-Part application of our application serial No. 287,077 filed Sept. 7, 1972.

The subject matter of the invention is an overload protection and display circuit designed for use in particular with high-power sound radiators which in a manner departing from the known solutions senses the real output of an electrical signal applied to its input and where unlike the methods so far known the moment of interference depends on the real output averaged for a sufficiently long memory-period preceding the interference and not on the momentary overload, in a manner that with a rising ambient temperature the memory time of the circuit tends to decrease in the same way as the load carrying capacity of the feature to be protected, in the present instance a sound radiator, also tends to decrease with the rise of the ambient temperature. After an overload has been applied, yet before the interference, the circuit sends out a warning signal to the operator and if the operator lifts removes the overload, no interference takes place.

For sake of uniformity of the description references have been listed at the end of the patent specification under their respective serial numbers appearing in brackets in the text.

Sound amplification in large structures such as sports halls, covered stadiums, theatres, etc. confronts the design engineers with tasks continually growing in gravity. In a modern sound system in the first place requirements of quality have to be met, and secondary demands for greater volume and loudness. The demand of quality, e.g. a wide transmission band, uniformity of the directional characteristic (1) from the very outset specifies certain technical solutions, and according to experience their satisfaction in general detracts from the efficiency of the loudspeakers. The (1) in the preceding sentence is the first one of the references relied on in the present disclosure. Consequently the demand for loudness, e.g. for the transmission of beat music, can be satisfied only with sound radiators possessing a high load carrying capacity, inasmuch as the improvement of the efficiency of sound radiators is limited by the quality of the magnetic materials avilable in the market (2).

As taught by experience, the permissible warming up of the moving coil sets a limit to the load carrying capacity of the sound radiators, provided that by applying an appropriate pasting method care is taken of clamping them with vibrating structural elements of the sound radiator (moving coil, centralizer, diaphragm) with satisfactory rigidity. Since modern adhesives allow of the assembly of the components of sound radiators satisfying the condition of rigidity, the load on a sound radiator cannot be increased beyond a temperature still sustained by the moving coil. Again experience teaches that a moving coil wound on a plastic-impregnated paper core and of a plastic-coated wire will endure an operating temperature of about 100°C. Hence the problem of overload protection will boil down to one of the limitations of overheating of the moving coil. However, since the temperature of the moving coil depends on the fed-in sound output as well as on the ambient temperature, preferably a method should be contrived for overload protection which takes into account the ambient temperature in a way that the protective circuit interferes more readily for rising ambient temperatures.

Obviously the protective circuit will come into action following upon the overload so as to prevent the moving coil of the sound radiator from warming up in excess of the permissible between the setting in of the overload and the moment of interference. At the same time when overload ceases, the protective circuit too will have to cease to interfere automatically, and this the sooner the better, lest the operation of the sound radiator should be disturbed for too long a time.

The definition of the signal, i.e. the programme signal applied to the sound radiator is a matter of special consideration. In point of fact this signal is not one of constant amplitude, e.g. a sinusoidal signal, but a signal varying stochastically in the temporal order. Obviously the electroacoustic chain as whole, and so the sound radiator must be capable of processing even the highest momentary value of the programme signal. On the other hand, the wrong course would be taken if the load carrying capacity of the sound radiator were defined by the output measured with the sinusoidal signal which agrees with the highest short-term peak output of the programme signal. Tests have been made regarding the statistical properties of a programme signal averaged for short periods. If the peak factor K of the programme signal averaged with an instrument measuring the effective value for a short term of 250 msecs were, in terms of decibels defined by the difference between the voltage level of the programme signal averaged for 250 msec associated with the probability of $W = 0.99$ and the voltage level of the programme signal averaged for a long term, then we find widely differing peak factors for the particular categories of programmes (3). This difference manifests itself not only for works belonging to the same artistic form (e.g. symphonic music, dance music, beat music, etc.) but also in the various interpretations of the very same work of art (4). For all programmes so far tested the peak factor was in all cases $20 \log K = 9$ dB in a way that the lowest values were obtained for beat music. For all other programmes considerably higher values were measured.

In other words the result is an indication that the output warming up the moving coil of the sound radiator is at most 12 per cent. of the short-term peak output averaged for a period of 250 msec. Hence the peak output is not characteristic of the warming up of the moving coil. What is characteristic is the long-term average output of the programme signal. It is essential therefore that the load carrying capacity of the sound radiator be preferably defined by the output measured with the sinusoidal signal, which warms up the moving coil to the same temperature as a programme signal applied to it for a long term.

Since at the sinusoidal output the short-term peak output of the programme signal is by at least 9 dB higher than this sinusoidal output, when for reasons of safety only a value of 6 dB is accepted, the amplifier supplying the sound radiator should be calculated for delivering the short-term output, which in this way will be four times the output limited by the warming up of the sound radiator.

As taught by experience the temperature of the moving coil of the loudspeaker of a sound radiator supplied with a sinusoidal voltage by an amplifier or a voltage source of a negligibly low internal resistance will tend to decrease with the rise of the frequency, contrary to what may be found in literature (5). On the other hand for properly calculated loudspeakers the highest temperature may be discovered in the frequency range where the absolute value of the impedance has a minimum. Dependent on the dimensions and design of the loudspeaker this frequency is in general between 200 and 800 Hz.

Now the load carrying capacity of the sound radiator limited by warming up may be defined either by the output associated with the sinusoidal signal which when fed in will keep warming up of the moving coil of the loudspeaker irrespective of the frequency of the signal below a permissible value, or by taking into consideration the frequency-dependence too of the output limited by warming up. In the former instance it will suffice when the protective circuit interfaces at an output in excess of the one associated with the above frequency and responsible for the permissive warming up, whereas in the latter instance interference will have to be frequency-dependent.

For the sake of completeness it should be noted that according to experience accumulated in practice in the majority of cases it will suffice when the protective circuits interferes regardless of frequency. Since the amplifier feeding the sound radiator is a voltage source, the output fed into the radiator will be proportionate to the r.m.s. value of the voltage appearing on the terminals of the sound radiator. The protective circuit should preferably respond to this value.

Obviously in an electroacoustic chain designed for an optimum value, i.e. one capable of being loaded up to the limit of warming up, the sound radiator must be protected against the contingent warming up of the moving coil by the output supplied by the amplifier to a temperature where it might be damaged. Under operating conditions, and on the assumption of proper handling, a case of this kind is unlikely to occur. Still it may happen that at the measurement of the electroacoustic chain with a sinusoidal signal, e.g. owing to the energization of the electroacoustical chain, or perhaps owing to overdrive caused by faulty operation, the moving coil will be overheated. It is the function of the overload protection circuit to prevent this irregular operation of the system that departs from the legitimate operating condition.

However, from the point of view of the user of the equipment interference in consequence of incorrect operation or overdrive, though always indispensable for the protection of the sound radiator, might often be unwelcome. As a matter of fact an audience is by far less sensitive to an overdrive of the electroacoustic chain than to a total breakdown of programme transmission, or its continuation with considerably reduced intensity. Therefore the protective circuit has to be designed in a way that sensing of the overload owing to incorrect operation or overdrive and its display shall take place by far before actual interference. If as soon as the trouble condition has been sensed the operator takes action to remove overdrive, preferably no interference shall come about.

In the following discussion the thermic heating up time constant of an element accommodated in a surrounding of constant temperature will be defined by the period elapsing between the beginning of heating and the moment the temperature of the element has attained the $(1 - e^{-1})$th part of the final temperature. Similarly the cooling down time constant of the heated element will be defined by the period elapsing between the moment heating has been laid off and the moment when the element has cooled down to the $(e^{-1})$th part of the initial temperature.

Furthermore by agreement the period between the moment the overload has been applied to the protective circuit and the moment of the actual interference of the protective circuit shall receive the designation of the memory period of the circuit. Similarly by agreement the period between the moment the overload has been applied to the circuit and the moment of the sensing and display of overload shall receive the designation of the moment of display of the protective circuit.

At the present state of technology for a solution of the problem as outlined above the following has to be postulated:

I. The protective circuit shall sense the output of the electrical signal applied to the input of the sound radiator, possibly in a manner dependent on the permissible warming up of the sound radiator, yet independently of the development or wave form of the signal in the temporal order, in a manner that sensing shall be proportionate to the r.m.s. signal voltage value applied to the input.

II. The heating up and cooling down time constant of the protective circuit shall be lower than that of the sound radiator, however, sufficiently large to prevent trouble conditions in the sound radiator to be controlled by the programme signal.

III. The memory period of the protective circuit shall decrease with increasing overload and ambient temperature.

IV. The protective circuit shall operate without the need for a special supply voltage source, and its power consumption shall be negligible.

V. Notwithstanding the interference of the protective circuit to the output terminals of the amplifier supplying the sound radiator permanently, a finite impedance other than zero shall be applied.

VI. The protective circuit shall at an appropriate moment before actual interference signal the overload condition to the operator; no interference shall take place if the operator removes the overload in time.

The methods and solutions described in professional literature satisfy part only of these requirements. In general instead of the output of the signal advanced to the input the circuits in question sense the average of the short-term output peaks in the temporal order only, and consequently come into action dependent on the average of the short-term output peaks in the temporal order, and not dependent on the average output referred to the memory period of the programme signal.

The operation of these circuits relies on the principle that in the protective circuit incorporating the sound radiator and terminated on the output points of the amplifier, the audio frequency a.c. voltage fluctuating in the temporal order, over a frequency-dependent network, feeds a rectifier whose rectified voltage passes to the winding of a relay connected in parallel to a capacitor. If the value of the current flowing in the relay winding exceeds the threshold value for the relay operation, the relay will operate and connect a resistor in series with the loudspeaker. In response to this action the current flowing in the loudspeaker will drop below the permissible value.

By an essentially method the relay cuts off the sound radiator in the event of an overload.

As will be made clear subsequently, the invention eliminates all critical deficiencies and shortcomings of these circuits. The circuit according to the invention differs from the circuits so far known in that an indirectly heated thermistor is connected in series with the relay winding, and then to these circuits in series, a Zener diode operating in the return direction is connected in parallel, while the filament winding of the indirectly heated thermistor is terminated on the input points of the protective circuit through a resistor in series with it.

The subject matter of the invention and further details of it will be described in detail on hand of several embodiments of the invention and the attached drawings, wherein FIG. 1 presents the circuit diagram of the simplest design of an overload protective device according to the invention, with only one protective circuit;

Figure 2:
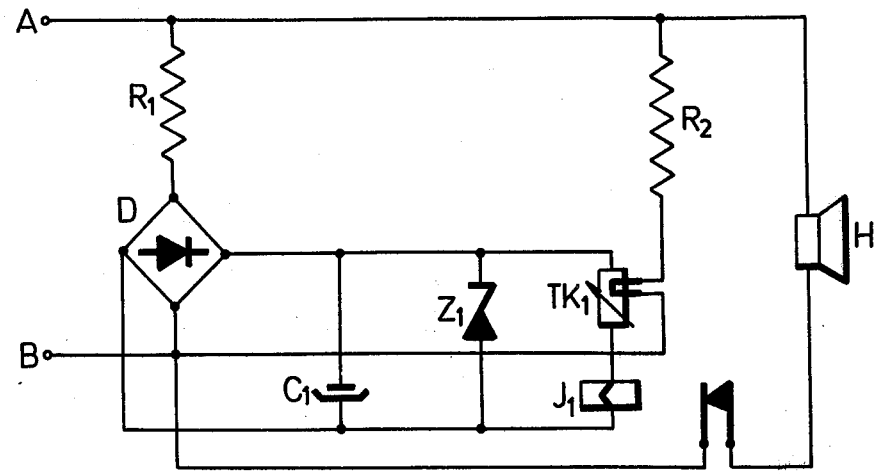
FIG. 2 is a variant of the embodiment according to FIG. 1.
Figure 3:
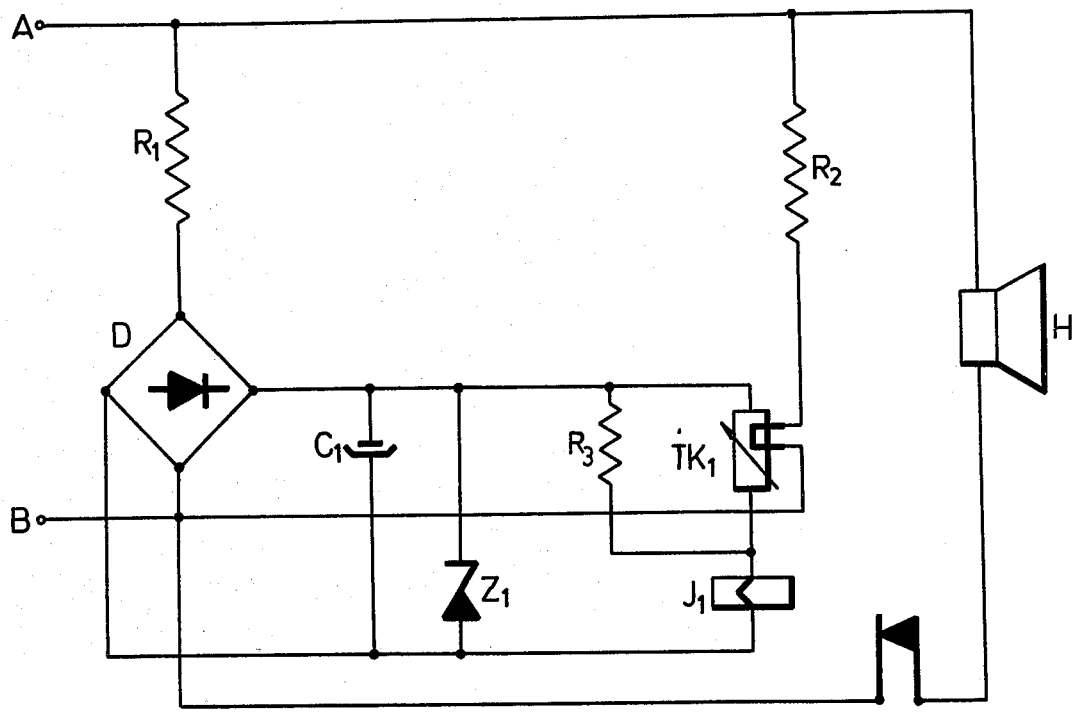
FIG. 3 is an improved embodiment of the solution according to FIG. 2.
Figure 4:
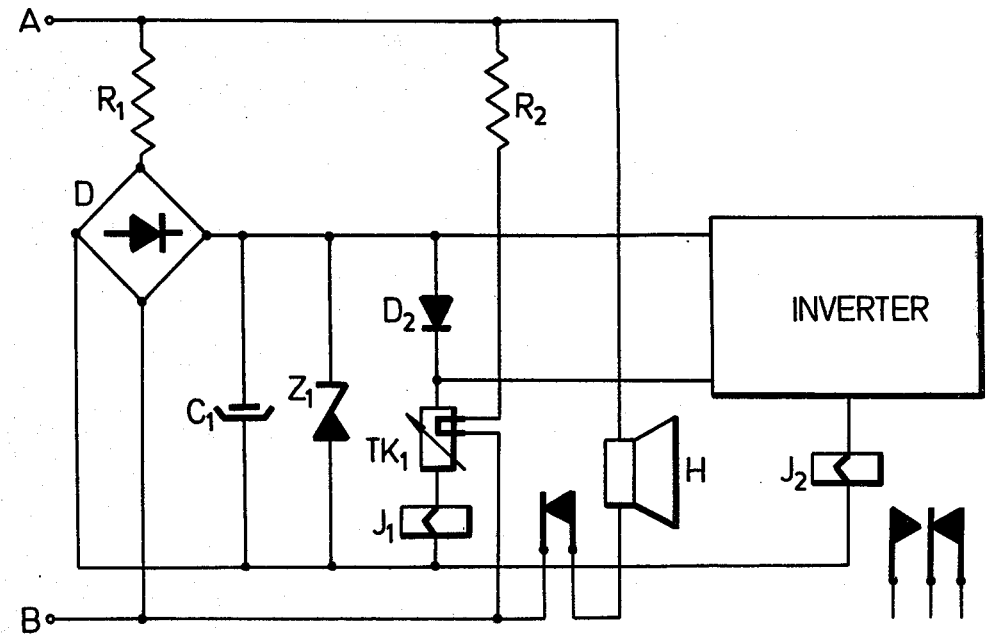
Figure 5:
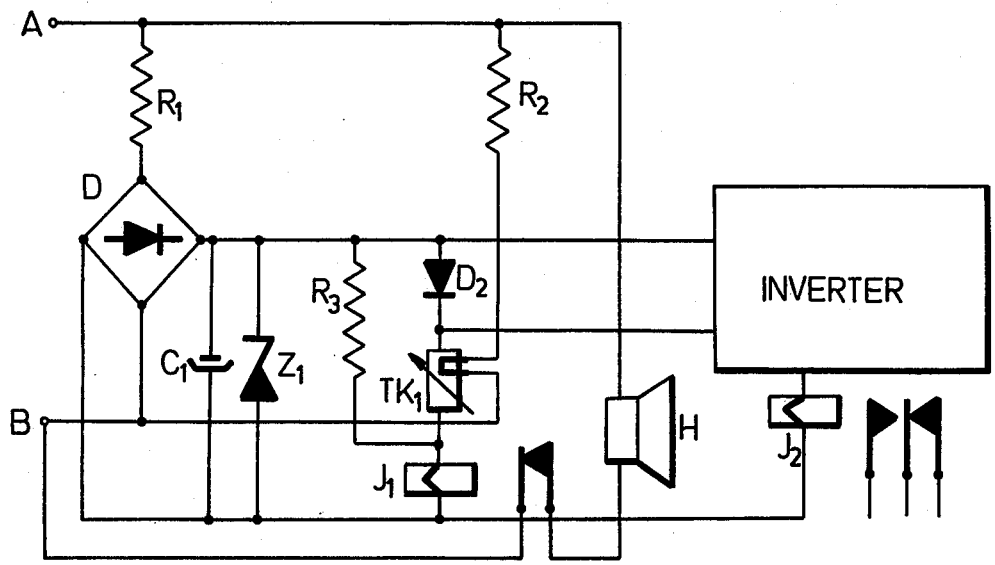
Figure 6:
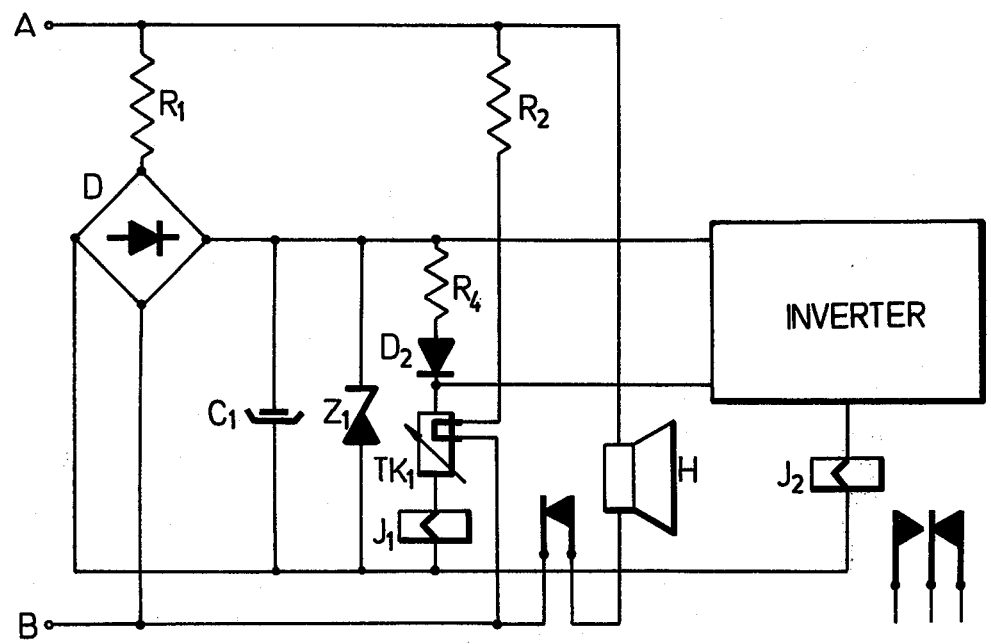
Figure 7:
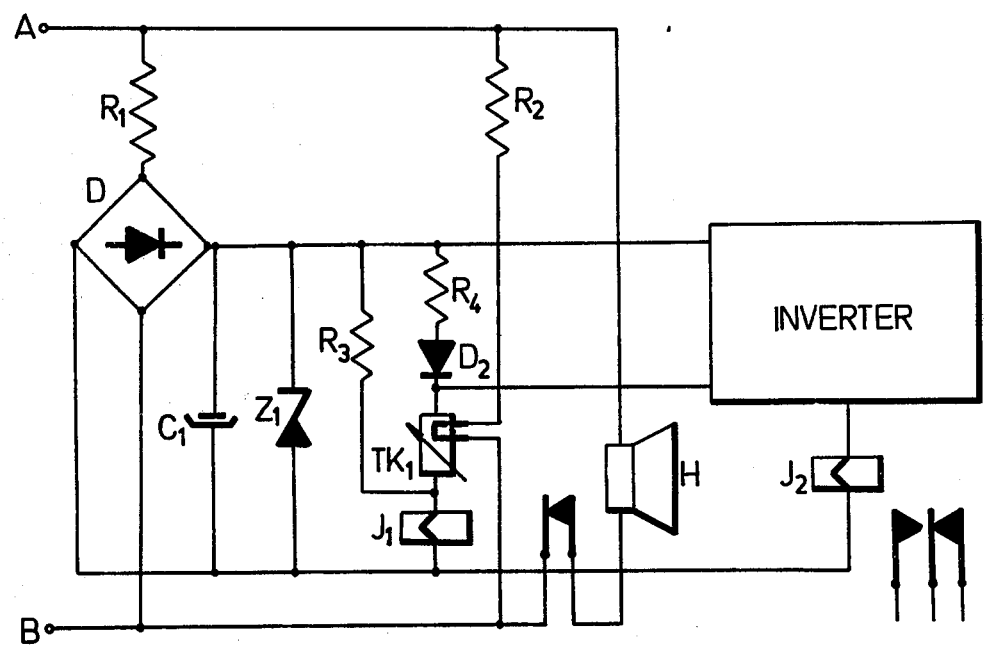
Figure 8:
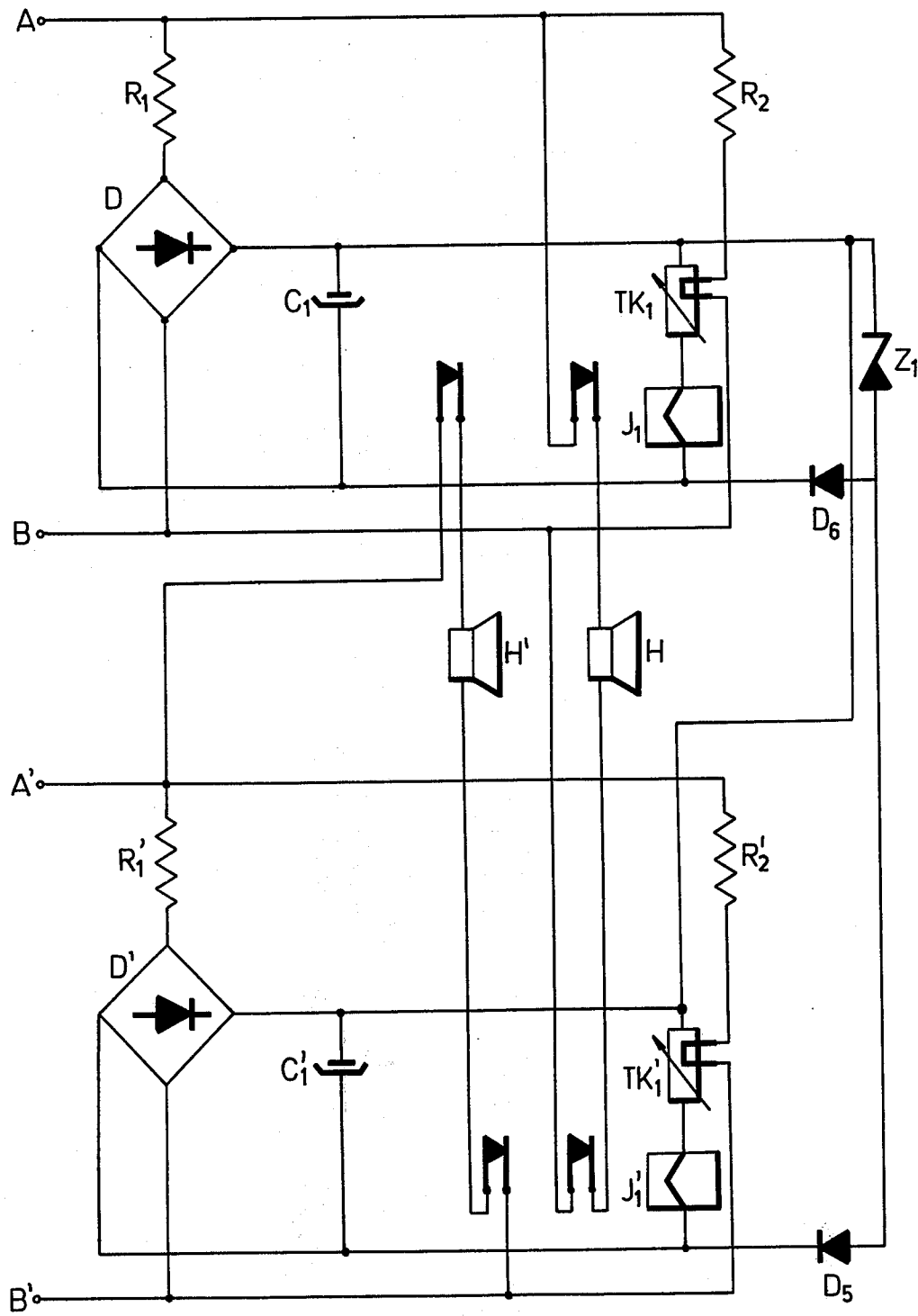
Figure 9:
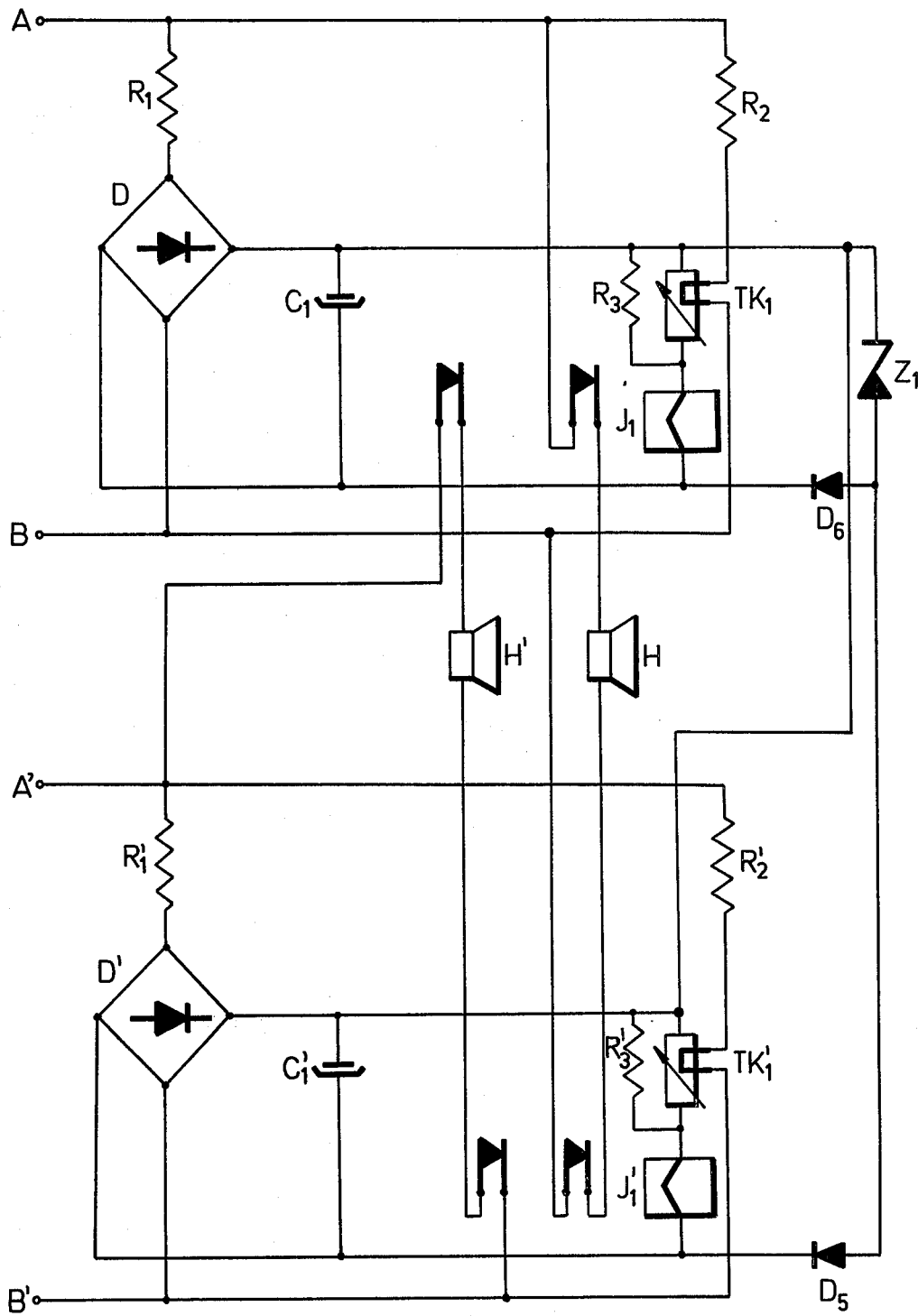
Figure 10:
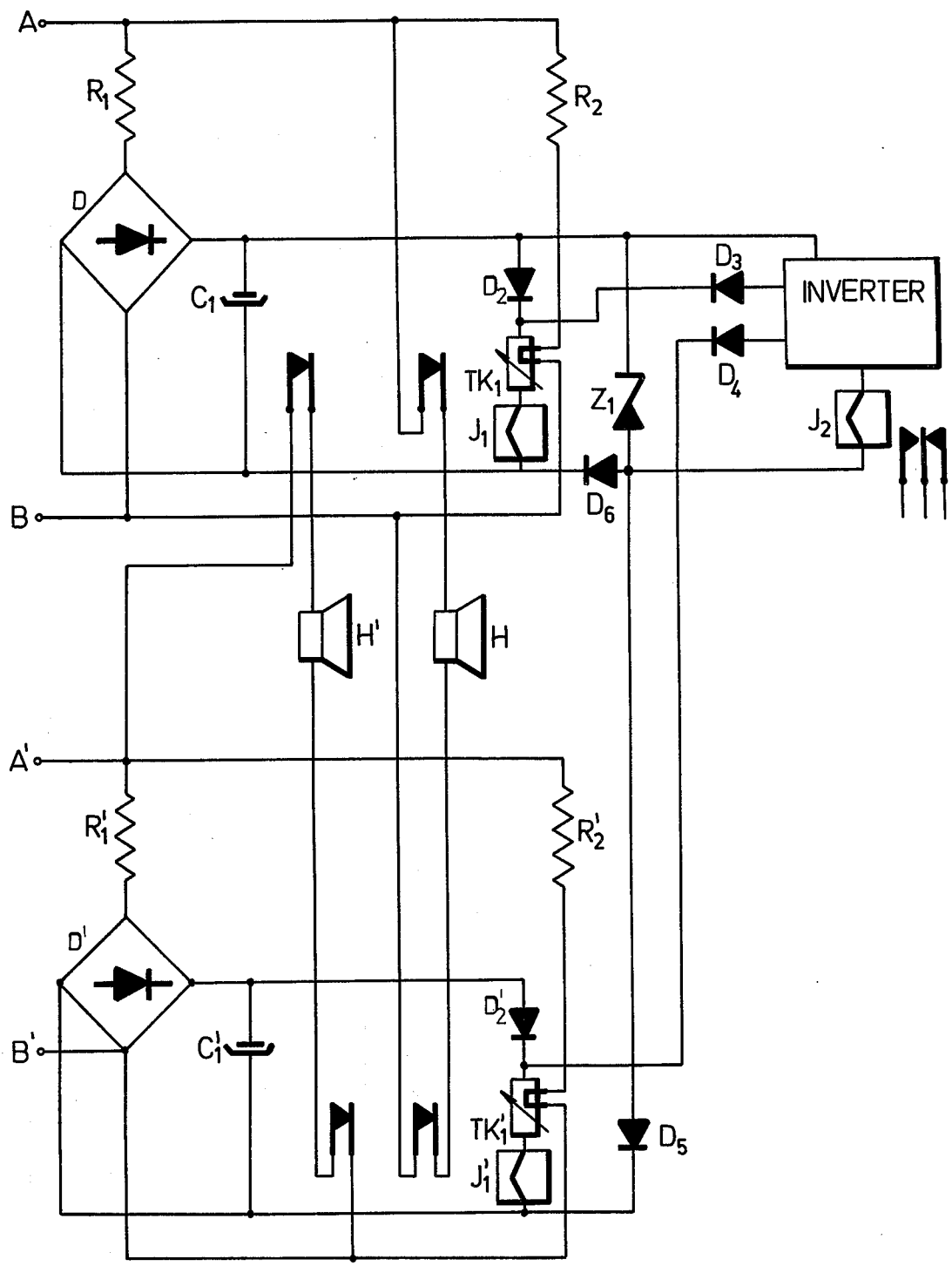
Figure 11:
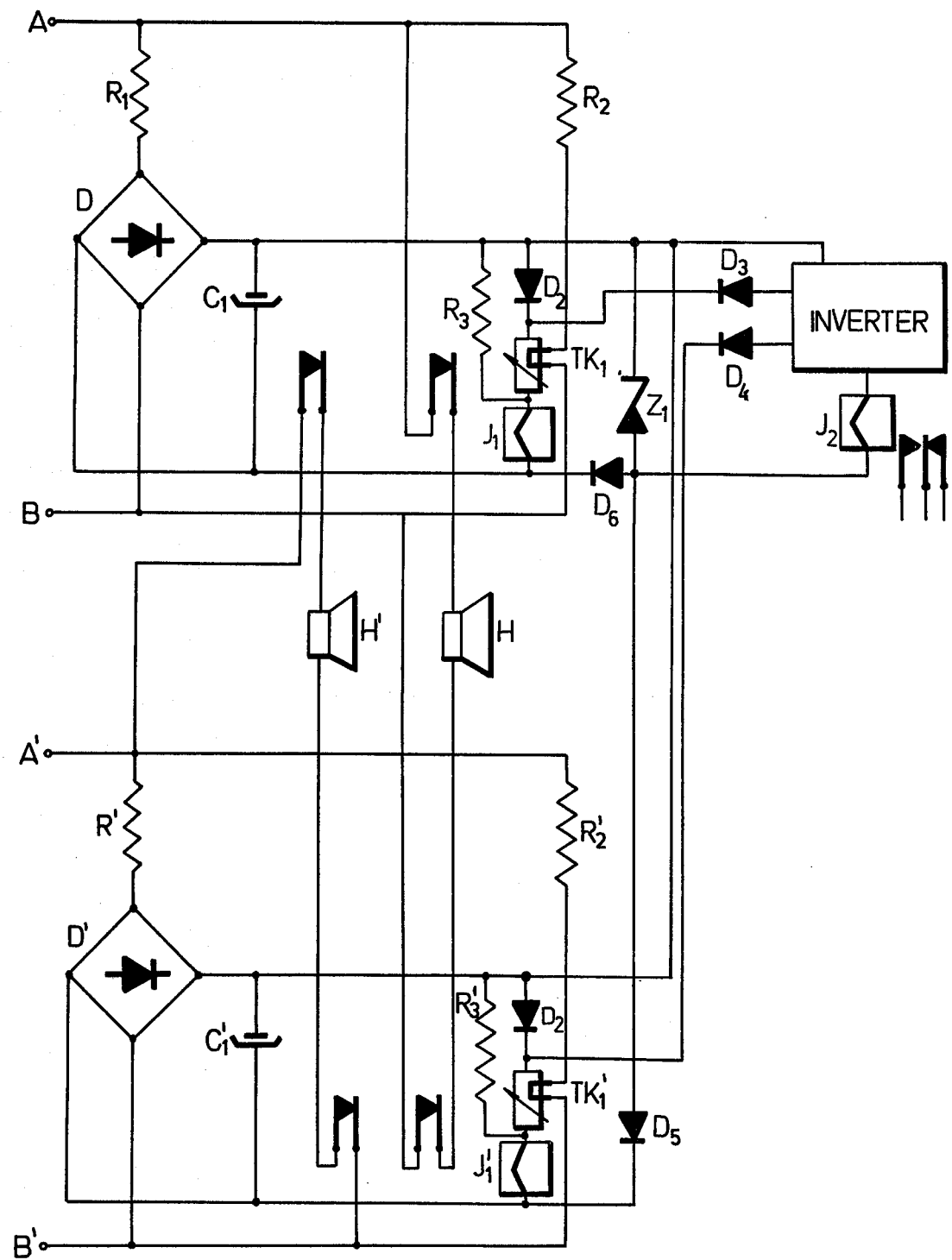
Figure 12:
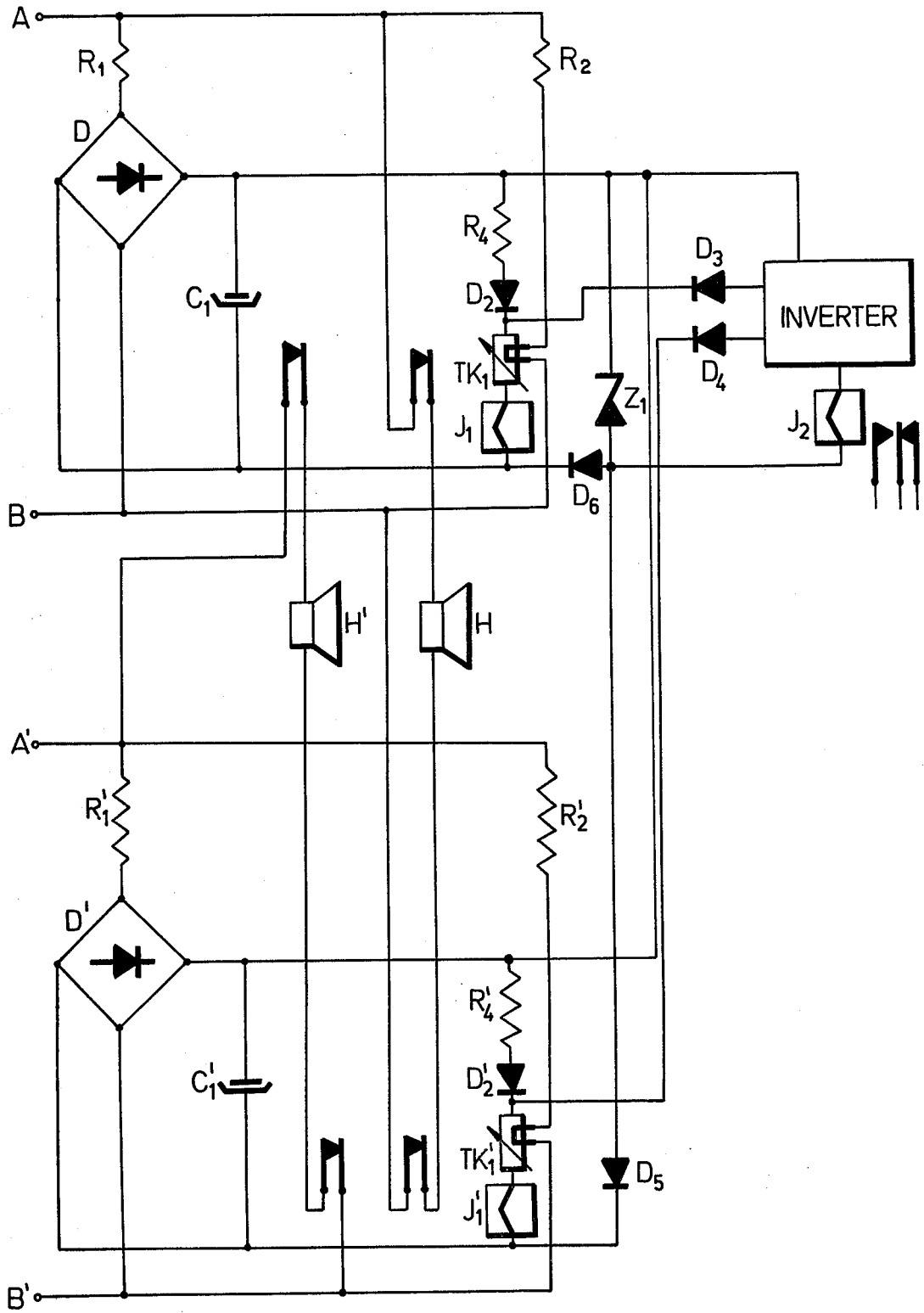
Figure 13:
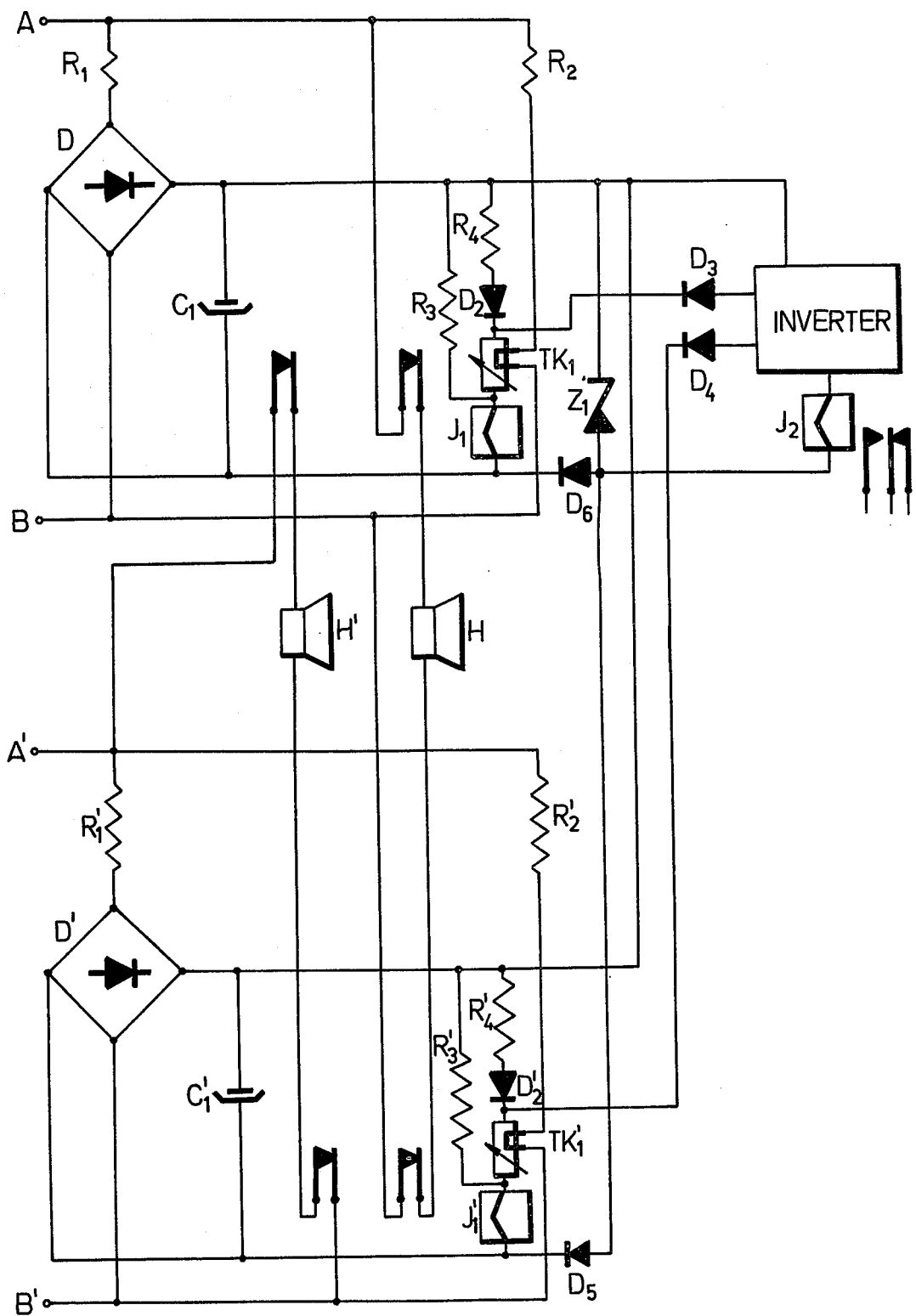
Figure 14:
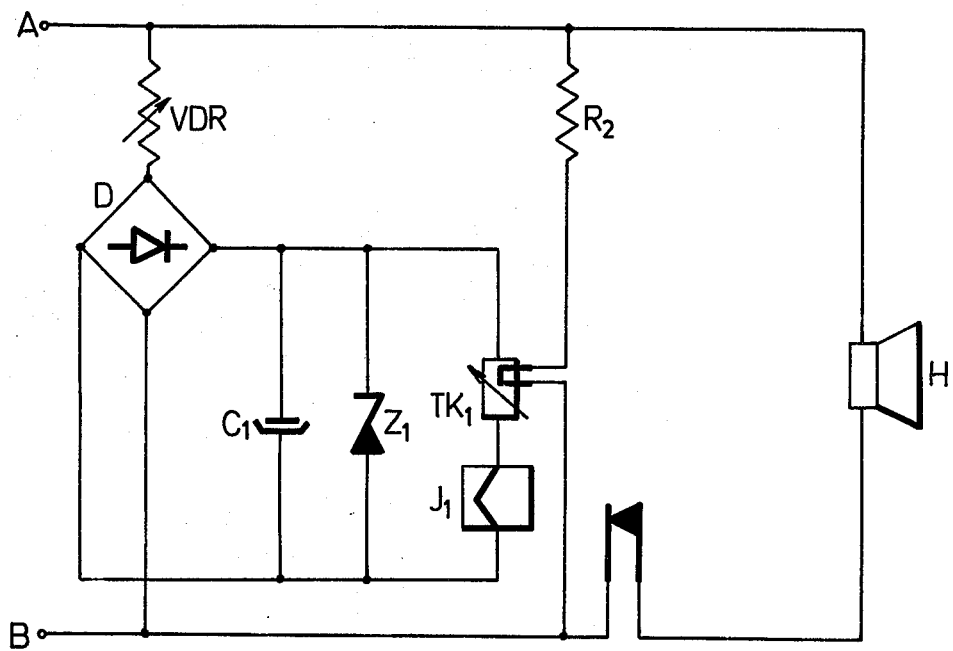
Figure 15:
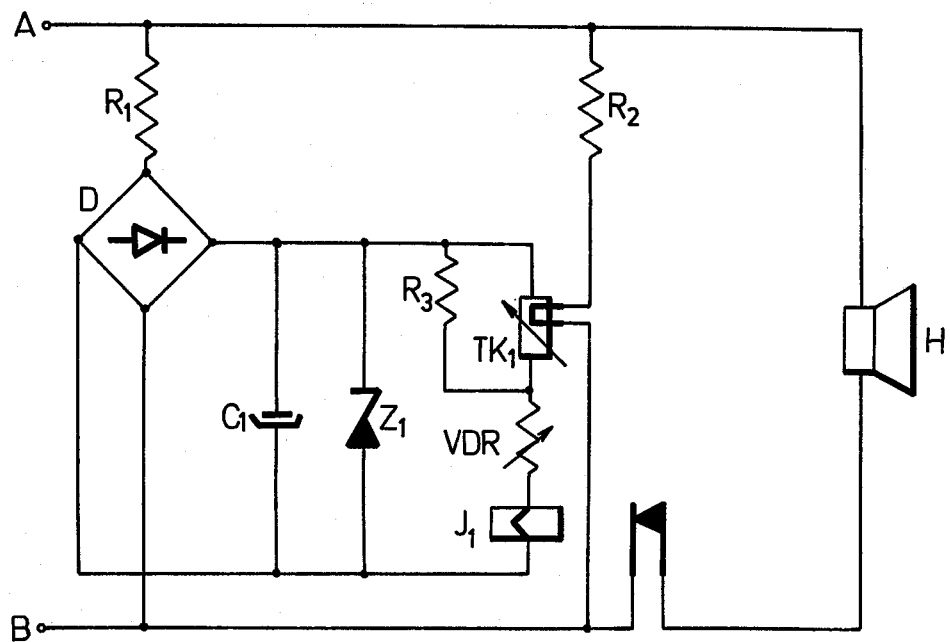
Figure 16:
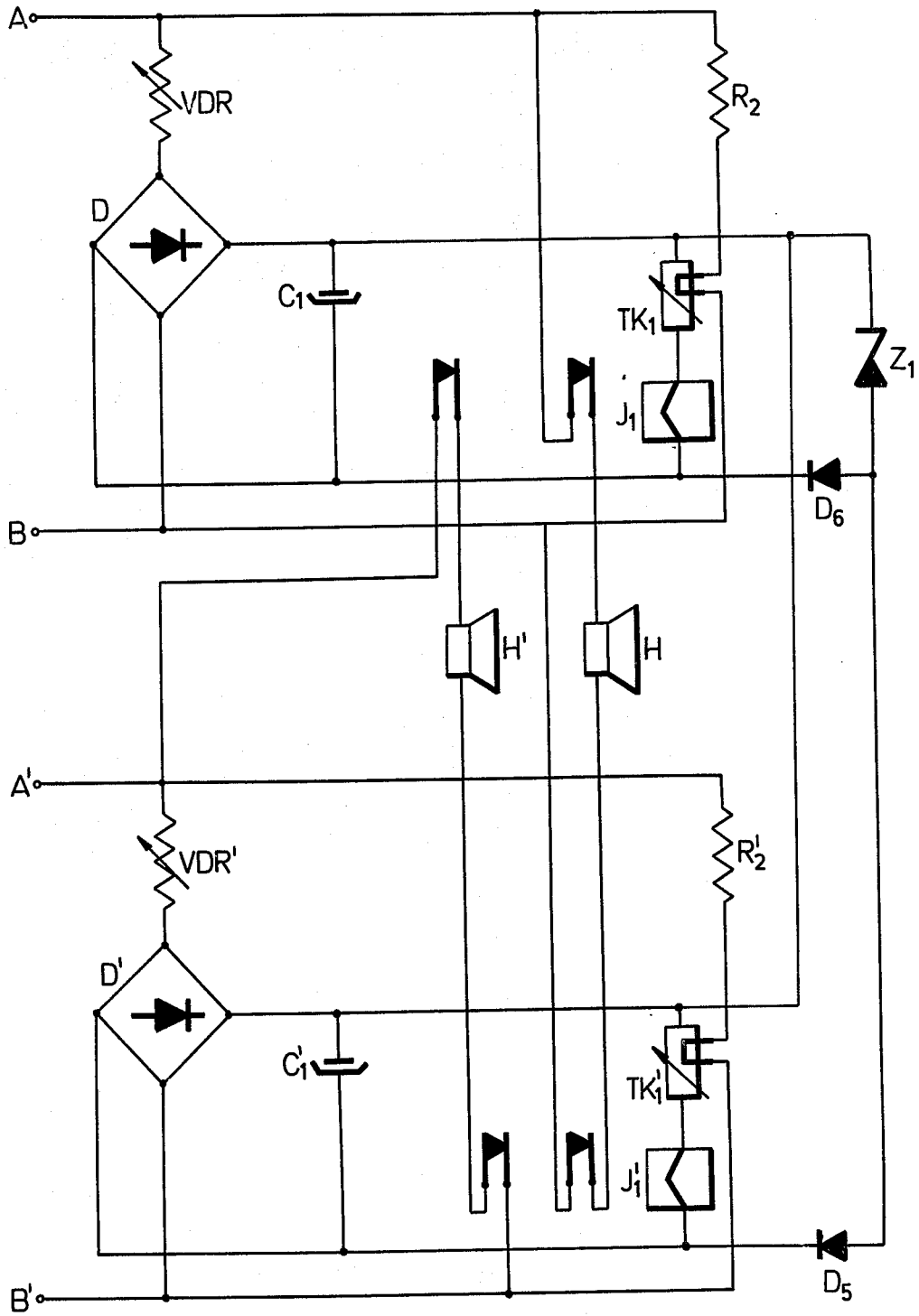

FIGS. 4 to 7 present different variations of the protective device according to the invention, each having only one protective circuit;

FIG. 8 presents an embodiment with two protective circuits according to FIG. 2 of the invention;

FIG. 9 shows an embodiment with two protective circuits according to FIG. 3;

FIG. 10 presents an embodiment with two protective circuits according to FIG. 4;

FIG. 11 presents an overload protective device with two protective circuits according to FIG. 5;

FIG. 12 presents an embodiment with two protective circuits according to FIG. 6;

FIG. 13 presents an embodiment with two protective circuits according to FIG. 7;

FIG. 14 presents a variant of the protection circuit according to FIG. 2;

FIG. 15 presents another variant of the protective circuit according to the invention; and FIG. 16 presents an embodiment comprising two protective circuits according to FIG. 14.

The known protective devices satisfy the earlier-discussed requirements (II), (IV) and (V) at most, however, they fail to meet the conditions of particular importance specified in (I), (II), or (VI). What is particularly unwelcome with said devices is the failure to sense the output of the signal advanced to the input. Instead they sense the average of the short-term output peaks in the temporal order, and consequently the device will interfere only dependent on the average of the short-term output peaks in the temporal order, and not dependent on the average output referred to the memory period of the programme signal. So e.g. for symphonic music the memory period of the circuit will be less than a second, whereas for dance music it will be of a value of barely a few seconds (5).

Such a device with a protective circuit operates on the following principle: In the protective circuit terminated on the output points of an amplifier, equipped with a loudspeaker attached to the circuit, an audio frequency a.c. voltage fluctuating in the temporal order via a frequency-dependent network comprising a variable resistor and a capacitor in parallel, supplies a diode, whose rectified voltage passes to the operating winding of a relay connected in parallel to a capacitor. If the value of the current flowing through the relay winding exceeds the threshold value for operation, the relay operates and connects a further resistor in series to the loudspeaker.

In response to this action the current flowing in the loudspeaker will drop to the permissible value. Since the rectifier circuit is essentially a peak rectifier loaded with the resistance of the relay winding, the memory period of the protective circuit will depend on the momentary peak values and not on the output of the signal advanced to the input points of the circuit, although for the purpose of warming up, the momentary peak values are meaningless.

Another disadvantage of the known circuit is the dependence of its memory period, owing to the use of a peak rectifier, on the wave form of the signal applied to the input, and on the other hand, its independence of the temperature. Furthermore the operation of the circuit critically depends on the stability of the properties of the relay in the temporal order.

In another known protective circuit (6) the difference is only that said relay is supplied by a full-wave rectifier. Consequently owing to the moderately pulsating d.c. voltage the operation of the relay will become somewhat more reliable. On the other hand at the same time in the event of overload conditions the circuit cuts off the loudspeaker, so that requirement (V) is not satisfied. Apart from these differences this protective circuit too labours with the same deficiencies as the one prior described.

Figure 1:
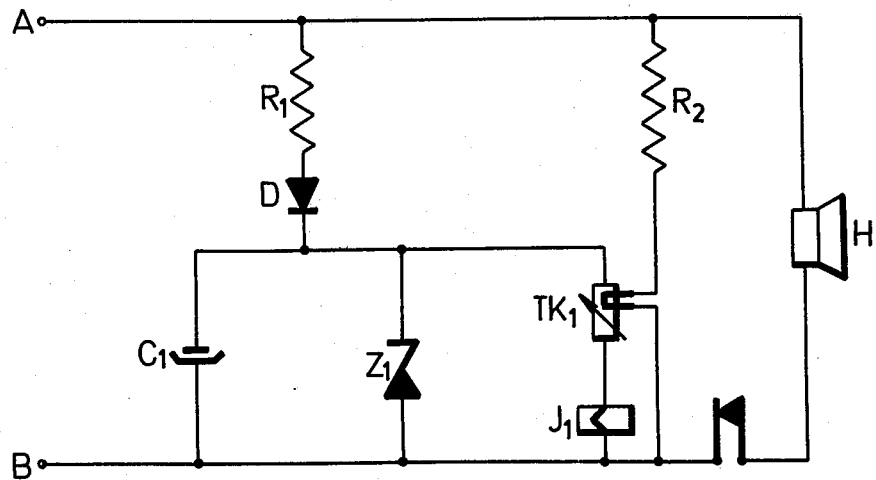

The protective device according to the invention satisfies the requirements specified in (I), (II), (III), (IV), (V), a relevant, exemplary circuitry being shown in FIG. 1. The circuit operates on the following principle:

For the time being let it be assumed that the value of a resistor $R_2$ in the circuit is extremely high, so that for practical purposes no current flows through it. In response to the voltage advanced to points A, B, a rectifier D will supply a pulsating d.c. voltage increasing proportionately to the input voltage. For protective purposes, a resistor $R_1$ is also included in the circuit, in series with the rectifier D. The voltage so supplied will be smoothed by a capacitor $C_1$. A Zener diode $Z_1$ stabilizes this growing d.c. voltage above an appropriately selected voltage (see reference 7). In this way the voltage at the poles of the Zener diode will become constant above a certain input voltage irrespective of the increase of the voltage of the signal advanced to points A, B, and of the wave form of the signal. The Zener diode is preferably selected so that its Zener voltage should be higher by about 10 per cent than the minimum voltage in response of which relay $J_1$ operates.

Parallel to the Zener diode an indirectly heated thermistor $TK_1$ in series (8) and the operating winding of a relay $J_1$ are connected. If an appropriate resistance is specified for these elements, the current flowing through the thermistor will, independently of the fluctuations of the input voltage U, be too significant to suffice for the operation of relay $J_1$. However, if the filament winding of thermistor $TK_1$ is by connecting the resistor $R_2$ of an adequate, yet finite value in series, terminated on points A-B, as shown in FIG. 1, then it will become directly evident that the filament output of the thermistor and so its thermistor will, in a manner independent of the progress of the electrical signal advanced to points A, B in the temporal order, depend on the output of the signal applied to terminals A, B.

A loudspeaker H is shown connected to the output of the circuit, behind a normally closed contact of the relay $J_1$. Since apart from a constant factor the output is proportionate to the square of the r.m.s. value, the temperature of the thermistor will in this way be proportionate to the square of the r.m.s. value of the signalling voltage advanced to points A, B. Consequently the r.m.s. signal voltage applied to points A, B exceeds a value preferably calculated from the output of the sound radiator to be protected limited by the warming up, the indirectly heated thermistor will warm up, and since its resistance tends to drop with the rise of the temperature, the d.c. voltage source stabilized by the Zener diode $Z_1$ will, through the circuit composed of the thermistor $TK_1$ and relay $J_1$, advance a current sufficient for the operation of the relay. Since the resistance of the thermistor is a function of the temperature, which in turn is controlled for a given ambient temperature by the current flowing through the filament circuit of the thermistor, the protective circuit will, dependent on the thermic warming up time constant of the thermistor, i.e., a value for a given thermistor variable by changing the value of resistor $R_2$, with the aid of the relay remove loudspeaker H from points A, B before any damage has occurred to the loudspeaker.

At the same time since the memory period is a function of the current flowing in the filament winding of the thermistor, with rising overload interference will come about sooner. Furthermore since the resistance of the thermistor depends on the current flowing in the filament winding as well as on the ambient temperature the resistance will tend to decrease, the memory period will in like way decrease with the rise of the ambient temperature.

If now the overload suddenly comes to an end, the voltage appearing along the Zener diode will rapidly decrease by a time constant $\tau_1 = C_1(R_T + R_j)$ defined by the thermal resistance $R_T$ of thermistor $TK_1$ and the ohmic resistance $R_j$ of the winding of relay $J_1$ in series with it, so that the relay will again close the circuit for the sound radiator. On the other hand if the overload is suddenly re-applied then the voltage appearing on the Zener diode with a time constant $\tau_2 = C_1(R_1 + R_D)$, where $R_D$ is the forward resistance of the diode, will for practical purposes immediately on its appearance again connect the loudspeaker provided that the time constant of the thermistor's cooling off is sufficiently large.

With tolerable approximation the protective circuit will load the amplifier with a resistance of $R = R_1 R_2 (R_1 + R_2)^{-1}$, since the values of $R_D$ and $R_z$, i.l.e. the differential resistance of the Zener diode may be ignored in comparison to $R_1$. similarly the resistance of the filament winding of the thermistor may also be ignored in comparison to $R_2$.

Provided that the appropriate circuit features have been selected, the loading impedance of the protective circuit may be ignored for practical purposes in view of the sound-radiator impedance.

In an actually built circuit the following values have been used for the particular components:

$R_1 = 285$ ohms, $R_2 = 3.6$ kiloohms, $C_1 = 400$ /µF, Zener voltage of the Zener diode $Z_1 = 18$ V, resistance of the operating winding of relay $J_1 = 685$ ohms. The indirectly heated thermistor is of the Type TI 40 (manufactured by kobanyai Porcelangyar, Budapest, Hungary), whose resistance is at room temperature about 40 kiloohms, the cooling off time constant 25 secs. The protective circuit has been set in a way that as soon as the output advanced to the input exceeds the value of 50 W it disconnects the 50-watt sound radiator of a load carrying capacity limited by the rate of warming up from the points A, B. For an input corresponding to 80 watts the circuit removes the sound radiator within four seconds following the connection of the load, for an output of 200 watts this period will become three seconds, i.e. the memory period is respectively four and three seconds. If the ambient temperature rises from 20°C. to 40°C., the memory period will drop by about 20 per cent. Within about 0.4 sec. following upon the cessation of the overload condition the protective circuit will restore the sound radiator. If again overload comes about immediately following upon the restoration of the loudspeaker, the protective circuit will for practical purposes disconnect again within about 0.3 sec. This welcome property of the circuit is due to the fact that during the very short time of about 0.7 sec for practical purposes the thermistor will not cool off, the cooling off time constant being 25 secs.

With a tolerable approximation the protective circuit represents a loading resistance of about $R = R_1 R_2 R_1 + R_2)^{-1} \approx 275$ ohms, a value sufficiently small to permit its being loaded by the amplifier permanently, and at the same time high enough compared to the 15-ohm impedance of the sound radiator so that the loss of output caused by the protective circuit remains about 0.20 dB, a negligibly low value.

The protective circuit executed in accordance with the invention therefore possesses all properties formulated in (I) to (V), in particular those of (I), (II) and (III).

In the embodiment shown in FIG. 2 instead of a single-way rectifier preferably a full-wave two-way rectifier has been used. Consequently as compared to the method presented in FIG. 1 a lower value has been chosen for condenser $C_1$. The value of $C_1 = 200$ /µF has proved satisfactory.

Although the method according to the invention, two embodiments of which have been shown in FIGS. 1 and 2, on the whole satisfies the conditions specified in (I) to (V), yet further improvement has been achieved by developing the circuit shown in FIG. 3. Here on the junction points of thermistor $TK_1$ and relay $J_1$ a resistor $R_3$ bridging the thermistor $TK_1$ has been terminated. This resistor constitutes a shunt for the thermistor, and consequently the protective circuit will operate with greater safety and accuracy. As a matter of fact by choosing a value for resistor $R_3$ suiting the cold resistance of the thermistor it can be guaranteed that as long as a negligible current will load the filament winding of the thermistor the current flowing through relay $J_1$ will predominantly flow through resistor $R_3$.

If the voltage applied to points A, B increases, the current flowing through the filament winding of the thermistor will increase too, so that there will be a drop in the resistance of the thermistor, and consequently the surplus current for the operation of relay $J_1$ will flow through the thermistor. By this method the self-heating of the thermistor could be prevented, and consequently a by far longer memory period could be guaranteed.

Consequently as compared to the methods in FIGS. 1 and 2 the set-up shown in FIG. 3 carries the advantage that by preserving all other benefits of the method the memory period of the circuit is raised to four or five times the earlier one. The memory period so increased with the aid of other modifications of the circuit to be detailed subsequently allows the operator time enough on receipt of an appropriate display to take action for lifting the overload due to incorrect handling. The design shown in FIG. 3 in this way provides facilities for meeting condition (III). As a matter of fact, as taught by experience, the cooling off conditions of the moving coil of a modern sound radiator are such, dependent on the value of the overload applied, as to permit the endurance of an overload in general for about ten seconds without any damage to the moving coil.

Another advantage of the method according to FIG. 3 is the improved safety of the operation of relay $J_1$. As a matter of fact a relatively great current will flow through the relay owing to resistor $R_3$ in series with it when for practical purposes thermistor $TK_1$ will still figure as a break in the circuit. At the same time, since thermistor $TK_1$ has ceased to be self-heating, the circuit will preferably respond more readily to changes in the ambient temperature.

In a practical realization of the invention satisfactory results were achieved when 470 ohms had been chosen as the value of resistor $R_3$. The values of all other components agreed with those specified for the circuit shown in FIG. 2.

A design capable of fully satisfying the condition specified in (VI) is shown in FIG. 4. Here thermistor $TK_1$ is connected in series with a diode $D_2$ operating in the forward direction. If the resistance of the thermistor is high, i.e. the current flowing through the filament winding is small, so that the sound radiator operates without an overload, then only an extremely small current will flow through the diode. On the other hand if overload conditions supervene, the current flowing through the diode will tend to rise rapidly.

The potential building up on the poles of the diode is applied to the input points of a logical NO-function pulse inverter using a conventional semi-conductor of known design. The elements of the inverter circuit should preferably be selected by having recourse to one or the other of the known processes (9). If e.g. a relay is inserted in the collector circuit of the inverter, no current will flow through the relay before the potential generated by the current flowing through the diode $D_2$ has exceeded the threshold voltage of the inverter. If the threshold voltage has been exceeded the inverter will become conducting and a maximum current defined by the circuit elements of the inverter will flow through the operating winding of a relay $J_2$ inserted in the collector circuit. In response to this current relay $J_2$ will operate.

An appropriately calculated circuit will cause relay $J_2$ to operate before relay $J_1$. Hence the contacts of relay $J_2$ may, dependent on the technical conditions specified be used conveniently for signalling the overload on the sound radiator in time and also for disconnecting the sound radiator unless the overload has been removed. The display period of the circuit may preferably be regulated by the appropriate selection of the diode $D_2$ operated in the forward direction, namely in a way that the display time will decrease if the slope of the forward voltage versus current characteristic of the actually used diode is steeper.

In one of the circuits actually executed a Tungsram Type AY 107 germanium diode was used. All other components were identical with those specified for the circuit according to FIG. 3.

According to FIG. 5 the resistor $R_3$ is applied similarly to FIG. 3, bridging the series circuit of the diode $D_2$ and the thermistor $TK_1$ of FIG. 4. The arm of the resistor $R_3$ is the same as discussed in detail in connection with FIG. 3.

As taught by experience the periods of time appearing in the exemplary circuit are wholly sufficient for the operator to take action in order to remove overload conditions due to a possible fault in operation, e.g. the overdrive of the electroacoustic chain.

The display time may even be reduced by means of a resistor $R_4$ in series with diode $D_2$ as demonstrated in FIGS. 6 and 7 respectively with reference to FIGS. 4 and 5 respectively. The value of the resistor $R_4$ is preferably a few hundred ohms. E.g. for a resistance of $R_4$ = 200 ohms the display time will drop by 20 per cent.

Each of the embodiments of the invention provides reliable protection for single-path sound radiators, i.e. sound radiators where the voltage advanced to the input points proceeds without the insertion of an electrical filter to the loudspeakers forming the sound radiators. However, for multi-path sound radiators, or in other words sound radiator systems, where by inserting an electrical filter the audio frequency band is split up into at least two frequency bands, the divided audio frequency signal of the bands supplies separate sound radiators. Obviously here too the load carrying capacity of the sound radiators constituting the sound radiating system should preferably be exploited to its full extent.

A system of this type is shown in FIG. 8, for sake of simplicity for a two-path sound radiating system based on the protecting circuit of FIG. 2. Since in the event of an overload arising at anyone of the sound radiators the system as a whole will have to be cut off, according to the invention this may be achieved in a way that a single voltage stabilizer consisting of a single commoned Zener diode $Z_1$ is provided for the multiple protective circuit. The Zener voltage of this diode should preferably be specified so as to be higher by about 10 per cent than the minimum voltage at which the relay $J_1$ operates.

In the dual protective circuit of the example one point of the capacitors $C_1$ and $C_1$ is respectively commoned. These points are at the same time terminated on one of the terminals of the Zener Diode $Z_1$, whereas the other terminals of the capacitors, with a diode $D_6$ and a diode $D_5$ respectively inserted, close the protective circuit for loudspeakers H and H' respectively. The protective circuit of loudspeaker H' is connected by diode $D_5$ into the protective circuit of loudspeaker H, namely at the junction of Zener diode $Z_1$ and diode $D_6$. In this manner any other protective circuit may be connected to the system. Since at the over-drive of any one of the sound radiators of the sound radiating system, the system as a whole will have to be cut off, the relays $J_1$ and $J_1'$ preferably form a logical OR connection.

In similar manner demonstrates FIG. 9 a dual protective device on the basis of FIG. 3; and FIG. 10 on the basis of FIG. 4. By way of example the inverter is connected to the diodes $D_2$ and $D'_2$ over a logical OR gate built up of the diodes $D_3$ and $D_4$.

FIG. 11 is the correspondent dual realisation of the protection device of FIG. 5; and FIG. 12 is in similar manner a dual realisation of the device according to FIG. 6. The resistors $R_4$ and $R'_4$ have a value of about 50 ohms. For the compensation of the voltage drop on the OR gate circuit built up of diodes $D_3$ and $D_4$ with the aid of the resistances $R_4$ and $R'_4$ the, points of one of the inputs of the OR gate are terminated on the terminals of a chain formed of the diode $D_2$ and the resistance $R_4$ in series with it, whereas the points of the other input are terminated on the terminals of a chain formed of the diode $D'_2$ and the resistance $R'_4$ in series with it.

FIG. 13 represents a dual protecting device on the basis of FIG. 7. The above-described details also apply to this device.

In the dual protective circuits of the examples the same components have been used as in the circuits shown in the single protective circuits. The diodes $D_2$, $D'_2$, $D_5$, $D_6$ are of Tungsram Type BAY 41, the resistors $R_4$, $R'_4$ have a value of 43 ohms.

In practice it may occur that the current needed for the operation of the available relay $J_1$ is by far in excess of the current discharged by the relay in operated condition. When a relay of this property is used the hysteresis of the protective circuit will become too large, i.e. the protective circuit will after the cessation of overload restore the sound radiator to the amplifier only if the voltage on the terminals A, B of the protective circuit, and so the output $P_o$ fed into the sound radiator, is by far below the load carrying capacity limited by warming up. The ratio of the output values, i.e. the hysteresis may, expressed in terms of decibels, amount to $10 \log P_o/P_o' = 10$ dB.

This impermissibly high hysteresis may be reduced to a value below one decibel, i.e. to a negligible value, by an appropriate modification of the protective circuit in a way that parallel to relay $J_1$ a further capacitor $C_2$, not shown), is connected, and to the parallel circuit formed of the winding of relay $J_1$ and the capacitor $C_2$ a further (not shown) resistor $R_5$, is connected in series. This resistor should then be connected in parallel to a further pair of back contacts of relay $J_1$. So until the protective circuit cuts off the sound radiator the back contact pair of relay $J_1$ will short-circuit resistor $R_5$, i.e. there will be no change in the process of disconnecting the sound radiator.

After the sound radiator has been cut off resistor $R_5$ will be connected in series to the winding of relay $J_1$. The value of the hysteresis may be controlled by selecting a resistor $R_5$ of appropriate value. By using capacitor $C_2$ a periodic ON-OFF (flip-flop) operation of relay $J_1$ may be prevented. With a capacitor $C_2 = 200$ $\mu$F and $R_5 = 250$ ohms the hysteresis of the protective circuit of the example could be reduced to 0.5 dB. In the absence of this capacitor and resistor, with the use of a relay $J_1$ of poor quality, the hysteresis of the circuit reaches a value of $> 10$ dB.

Satisfactory results have been obtained by discarding the back contact pair of relay $J_1$, short-circuiting in the normal state of the relay capacitor $C_2$ and resistor $R_5$. On the other hand a resistor $R_5$ of constant value has been replaced by a voltage dependent resistor (VDR) (10) as demonstrated in FIG. 15. Prefereably a VDR should be selected whose value is below that of the resistance of the winding of relay $J_1$ with the relay "ON", whereas with the relay "OFF" the value of the VDR should be at least twice that of the resistance of the winding. Satisfactory results, i.e. a hysteresis of $< 1$ dB has been obtained with a Philips Type 232,255,401,181 VDR.

Similarly satisfactory results have been obtained with a VDR directly substituted for resistor $R_1$ according to FIG. 14, with a chain of resistors formed of the connection in series and/or parallel of resistor(s) of a constant value and VDR(s), and inserted in the place of $R_1$. The value of both the VDR replacing $R_1$ and the resistor chain incorporating VDR(s) substituted for resistor $R_1$ should preferably be specified in a way that when a voltage is applied to points A, B at which the Zener diode $Z_1$ stabilizes the d.c. voltage, the value of the VDR or of the resistor chain should approximately agree with the value of $R_1$. In the present instance a Philips Type 232,225,501,161 voltage dependent resistor inserted in the place of $R_1$ has produced a hysteresis of less than one decibel.

FIG. 16 demonstrates a dual circuit built on the basis of the protective circuit of FIG. 14, the earlier disclosure being valid in this case too.

What we claim is:

1. An overload protective device for processing non-uniform program signals such as speech and music, from a high-power source such as an amplifier means, to at least one high-power electro-acoustic transducer means such as loudspeakers or sound radiators, said device comprising at least one protective circuit, including a first relay therein having a winding and at least one pair of back contacts; a first resistor, a rectifier and a capacitor in a first series chain connection: the sound radiator being in series with said back contacts, connected in parallel with said first chain connection; a reverse-operating Zener diode connected in parallel with said capacitor; a first circuit including in series an indirectly heated thermistor and said relay winding, said first circuit also being connected parallel with said capacitor; said thermistor including a filament winding connected in series with a second resistor; and a second circuit connected in parallel with said first chain connection; constituting means for sensing an overload condition at the output of the high-power source, means for temporarily interrupting full load to the sound radiator upon occurrence of the overload condition, means for immediately re-establishing the full load when the overload condition has subsided, and means for providing a predetermined time lag in the activation of at least one of said interrupting and said re-establishing means.

2. The overload protective device as defined in claim 1, further comprising a third resistor in at least one of said protective circuits, connected in parallel with said thermistor.

3. The overload protective device as defined in claim 1, further comprising a voltage-dependent fourth resistor in at least one of said protective circuits, connected in series with said first relay.

4. The overload protective device as defined in claim 1, wherein said first resistor is voltage-dependent.

5. The overload protective device as defined in claim 1, further comprising a diode connected in series with said first circuit in at least one of said protective circuits, for operation in the forward direction, and a transistorized pulse-inverter circuit having input terminals to which the poles of said series diode are connected, and including a transistor, the emitter of the latter being connected to one terminal of said Zener diode while the collector of said transistor is connected in series with a winding of a second relay, which latter is in turn connected to the other terminal of said Zener diode.

6. The overload protective device as defined in claim 5, further comprising a fifth resistor in at least one of said protective circuits, connected in parallel with the poles of a second series chain connection, which latter includes said series diode and said thermistor.

7. The overload protective device as defined in claim 5, further comprising a sixth resistor in at least one of said protective circuits, connected in series with said series diode, and wherein said input terminals of the pulse-inverter circuit are connected in parallel to the terminals of a third circuit consisting of said series diode and said sixth resistor.

8. The overload protective device as defined in claim 7, further comprising a seventh resistor in at least one of said protective circuits, connected in parallel with the poles of a third series chain connection, which latter includes said sixth resistor, said series diode and said thermistor.

9. The overload protective device as defined in claim 5, comprising at least two of said protective circuits, with said Zener diode in only one of said protective circuits, wherein one of said protective circuits has a second diode for operation in the forward direction, connected in series with said Zener diode, while in the other of said protective circuits a junction point of said capacitor and said first circuit is connected to said capacitor of the one protective circuit, while in said other protective circuits another junction point of said capacitor and said first circuit is connected to a junction point of said Zener diode and said second diode via a third diode for operation in the forward direction, and wherein the sound radiator in each protective circuit is connected in series with said back contacts of the first relays of said other protective circuits.

10. The overload protective device as defined in claim 9, wherein said poles of the series diode are connected to said input teriminals of the pulse-inverter circuit via an OR gate, said emitter of the transistor is connected to said one termminal of the Zener diode in said one protective circuit, while said second relay winding is in turn connected to said other terminal of the Zener diode in said one protective circuit.

* * * * *